US010829652B2

(12) United States Patent
Wang et al.

(10) Patent No.: US 10,829,652 B2
(45) Date of Patent: Nov. 10, 2020

(54) WATERPROOF AND ANTI-STICKING INK FOR STERILIZATION MONITORING INDICATING ADHESIVE TAPE

(71) Applicant: NANJING JUSHA DISPLAY TECHNOLOGY CO., LTD., Nanjing (CN)

(72) Inventors: Wei Wang, Nanjing (CN); Pingle Zhou, Nanjing (CN)

(73) Assignee: Nanjing Jusha Display Technology Co., Ltd., Nanjing (CN)

( * ) Notice: Subject to any disclaimer, the term of this patent is extended or adjusted under 35 U.S.C. 154(b) by 257 days.

(21) Appl. No.: 15/768,808

(22) PCT Filed: Sep. 26, 2016

(86) PCT No.: PCT/CN2016/100129
§ 371 (c)(1),
(2) Date: Apr. 16, 2018

(87) PCT Pub. No.: WO2017/071445
PCT Pub. Date: May 4, 2017

(65) Prior Publication Data
US 2018/0305568 A1 Oct. 25, 2018

(30) Foreign Application Priority Data
Oct. 30, 2015 (CN) .......................... 2015 1 0729228

(51) Int. Cl.
*C09D 11/00* (2014.01)
*C09D 11/102* (2014.01)
(Continued)

(52) U.S. Cl.
CPC .............. *C09D 11/102* (2013.01); *C08K 3/22* (2013.01); *C08K 3/36* (2013.01); *C08K 5/5419* (2013.01);
(Continued)

(58) Field of Classification Search
CPC combination set(s) only.
See application file for complete search history.

(56) References Cited

U.S. PATENT DOCUMENTS 6,096,469 A * 8/2000 Anderson ................ B41M 5/52
423/335

FOREIGN PATENT DOCUMENTS

CN        1821320 A   *  8/2006
CN      103911039 A   *  7/2014

* cited by examiner

*Primary Examiner* — James E McDonough

(57) ABSTRACT

This invention discloses a waterproof and anti-sticking ink for sterilization monitoring indicator tapes, comprising a mesoporous nanomaterial, an oil-based binder, an oil-based diluent and a defoamer. During the production of the sterilization indicator tape, the color-changing ink is printed on medical-grade textured paper tape substrate and then waterproof and anti-sticking ink is coated thereon. The mesoporous nanomaterial in the waterproof and anti-sticking ink can provide the penetration of vapor and impermeability of condensed water. The oil-based binder can withstand high temperature vapor, and has excellent adhesion to a textured paper substrate, with the adhesion level being ISO-4B; and the oil-based binder can link the mesoporous material together to form a layer of dense mesh structure on the indicator tape, thereby enhancing the adhesion of the waterproof and anti-sticking ink on the tape surface and preventing the waterproof coating from being stuck away by a pressure-sensitive adhesive during the winding process.

12 Claims, 2 Drawing Sheets

(51) Int. Cl.
*C09D 7/40* (2018.01)
*C09D 11/107* (2014.01)
*C09D 11/03* (2014.01)
*C09D 7/61* (2018.01)
*C09D 7/63* (2018.01)
*C08K 3/22* (2006.01)
*C08K 3/36* (2006.01)
*C08K 5/5419* (2006.01)
C09D 1/00 (2006.01)
C09D 4/00 (2006.01)
C09D 5/00 (2006.01)
C09K 3/00 (2006.01)
B82Y 30/00 (2011.01)

(52) U.S. Cl.
CPC ................ *C09D 7/40* (2018.01); *C09D 7/61* (2018.01); *C09D 7/63* (2018.01); *C09D 11/03* (2013.01); *C09D 11/107* (2013.01); B82Y 30/00 (2013.01); C08K 2003/2227 (2013.01); C08K 2003/2237 (2013.01)

WATERPROOF AND ANTI-STICKING INK FOR STERILIZATION MONITORING INDICATING ADHESIVE TAPE

CROSS-REFERENCE TO RELATED APPLICATIONS

This application is a national stage application under 35 U.S.C. 371 of International Application No. PCT/CN2016/100129, filed Sep. 26, 2016, which is incorporated herein by reference in its entirety, which claims priority to Chinese Application No. 201510729228.9, filed Oct. 30, 2015, which is incorporated herein by reference in its entirety.

FIELD OF THE INVENTION

The present invention relates to a water-proofing anti-sticking ink for sterilization monitoring indicator tapes.

BACKGROUND OF THE INVENTION

It is well known that effective sterilization of a medical package is a key point in preventing postoperative infections in patients, and a sterilization monitoring indicator tape is attached to the outside of a dressing package or a surgical instrument package for indicating whether the package has been sterilized, thereby avoiding it to be interblended with other unsterilized packages. After stabilization, if color changing of the indicator tape is non-uniform or incomplete, it is indicated that the package has not been sterilized under required conditions; during packaging, in the case of not using a packaging tape, the sterilization monitoring indicator tap can be used for wrapping and packaging. After a medical package is sterilized, it should be checked whether the detection results of the sterilization monitoring indicator tap is qualified, and the medical package can be delivered to an operating room only when it is qualified. If a sterilization monitoring indicator tap is not subjected to waterproofing treatment, or its water-proofing coating does not withstand high temperature vapor and has poor adhesion to a tape substrate, or sterilization indicating ink has poor adhesion to a medical-grade textured paper tape substrate, the strip-off of indicating ink may occur easily, which may cause a misjudgment of sterilization operators, resulting in secondary sterilization of a medical package which has been sterilized qualifiedly, thereby increasing the cost of sterilizing the medical package. Therefore, it is particularly important to use a sterilization monitoring indicator tape having stable discoloration, water-proofing and anti-sticking properties, in order to avoid a misjudgment of a sterilization operator on the outcome of color change of a sterilization monitoring indicator tape. However, it is always a challenge to produce water-proofing ink which is capable of ensuring the water-proofing property of an indicator tape in combination with stronger adhesion to a medical-grade textured paper substrate, so as to protect color-changing ink from being stuck away by a pressure sensitive adhesive.

SUMMARY OF THE INVENTION

An object of the present invention is to provide a water-proofing anti-sticking ink for sterilization monitoring indicator tapes, which can effectively protect color-changing ink from being washed out and make it convenient for a user to identify the results of color change relatively accurately and rapidly, so as to avoid re-sterilization of a medical package which has been sterilized qualifiedly.

An technical solution of the present invention is to provide a water-proofing anti-sticking ink for sterilization monitoring indicator tapes, comprising a mesoporous nanomaterial, an oil-based binder, an oil-based diluent and a defoamer.

Based on the above technical solution, an additional technical solution is also provided as follows:

The mesoporous nanomaterial is silica, titanium dioxide, alumina, tin oxide, or a mixture of any two or more thereof.

The solid content of the mesoporous nanomaterial accounts for 10-20% by mass.

The oil-based binder can withstand high temperature vapor of 140° C. and has an adhesion to a textured paper substrate, with the adhesion level being ISO-4B.

The oil-based binder is a solvent-based polyurethane, or epoxy resin, or acrylic resin, accounting for 30% by mass.

The oil-based diluent is 783 slow-dry-type diluent.

The main active ingredient of the defoamer is polydimethylsiloxane, accounting for 0.5%-1% by mass.

The sterilization monitoring indicator tape is a pressure steam sterilization indicating tape, or an ethylene oxide sterilization indicator tape, or a plasma sterilization indicator tape; and during the production of a sterilization monitoring indicator tape, color-changing ink is coated on a medical-grade textured paper tape, and then a layer of the above-mentioned water-proofing anti-sticking ink is coated thereon.

The solid content of the mesoporous nanomaterial accounts for 10-20% by mass, the oil-based binder accounts for 20-40% by mass, the oil-based diluent accounts for 50-60% by mass, and the defoamer accounts for 1-5% by mass.

The advantages of the present invention are as follows:

The present invention provides a water-proofing anti-sticking ink for sterilization monitoring indicator tapes, in which a mesoporous nanomaterial can effectively provide the penetration of vapor and impermeability of condensed water. The oil-based binder can withstand high temperature vapor of 140° C. and has excellent adhesion to a textured paper substrate, with the adhesion level being ISO-4B. The oil-based binder can link the mesoporous material together to form a layer of dense mesh structure on the color-changing ink, and the mesh structure has excellent adhesion to the textured paper tape at the bottom layer. Therefore, a layer of water-proofing anti-sticking ink coated on the outside of the color-changing ink can effectively protect the color-changing ink from being washed out or stuck away by a pressure-sensitive adhesive, and make it easy for a sterilization operator to identify the results of color change accurately and rapidly, so as to avoid re-sterilization of a medical package which has been sterilized qualifiedly.

BRIEF DESCRIPTION OF THE DRAWINGS

The present invention will be further described with reference to the accompanying drawings and examples.

DETAILED DESCRIPTION OF THE INVENTION

Figure 1:
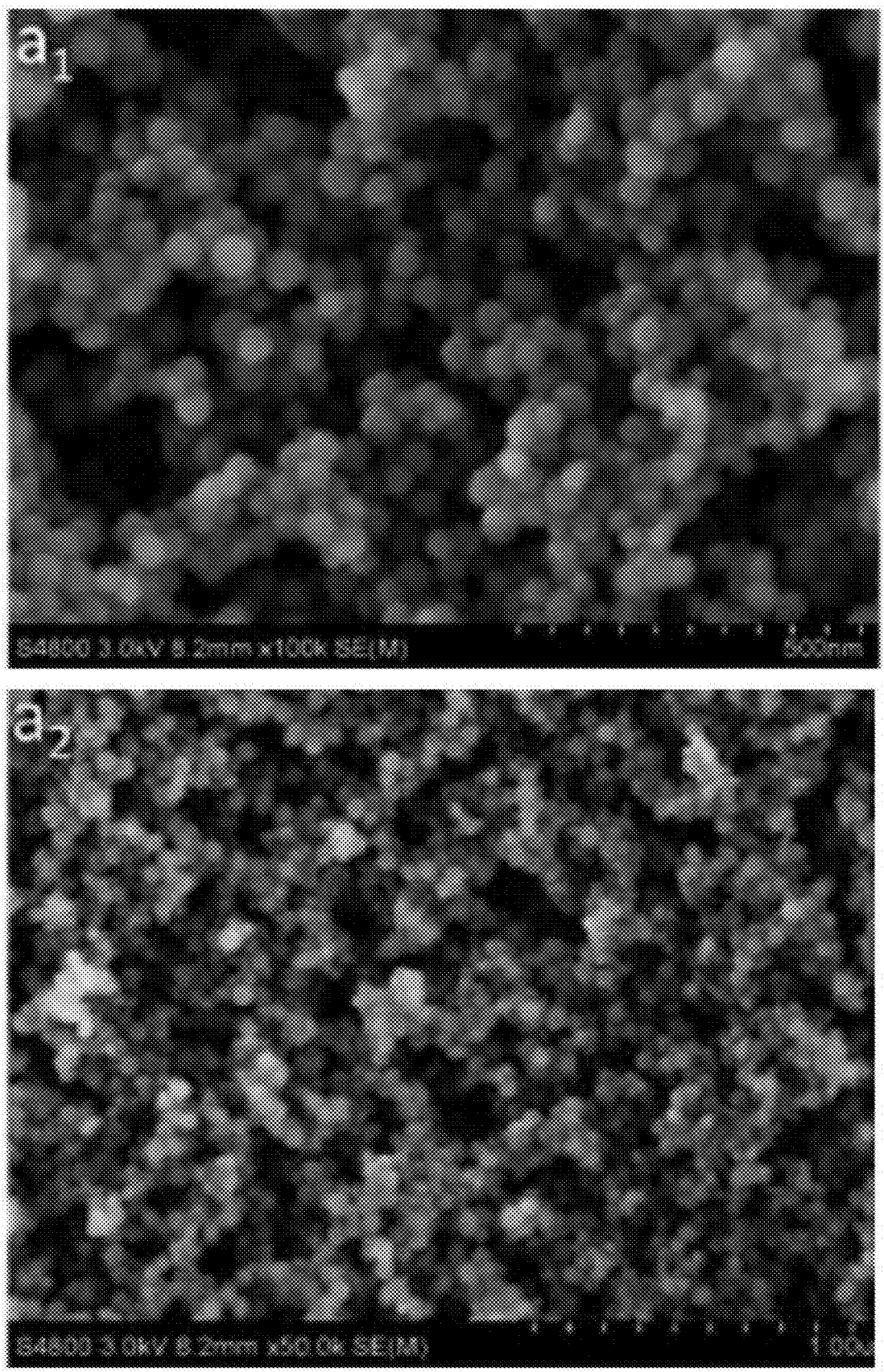
FIG. 1 is an FESEM photograph of mesoporous silica in accordance with the invention.
Figure 2:
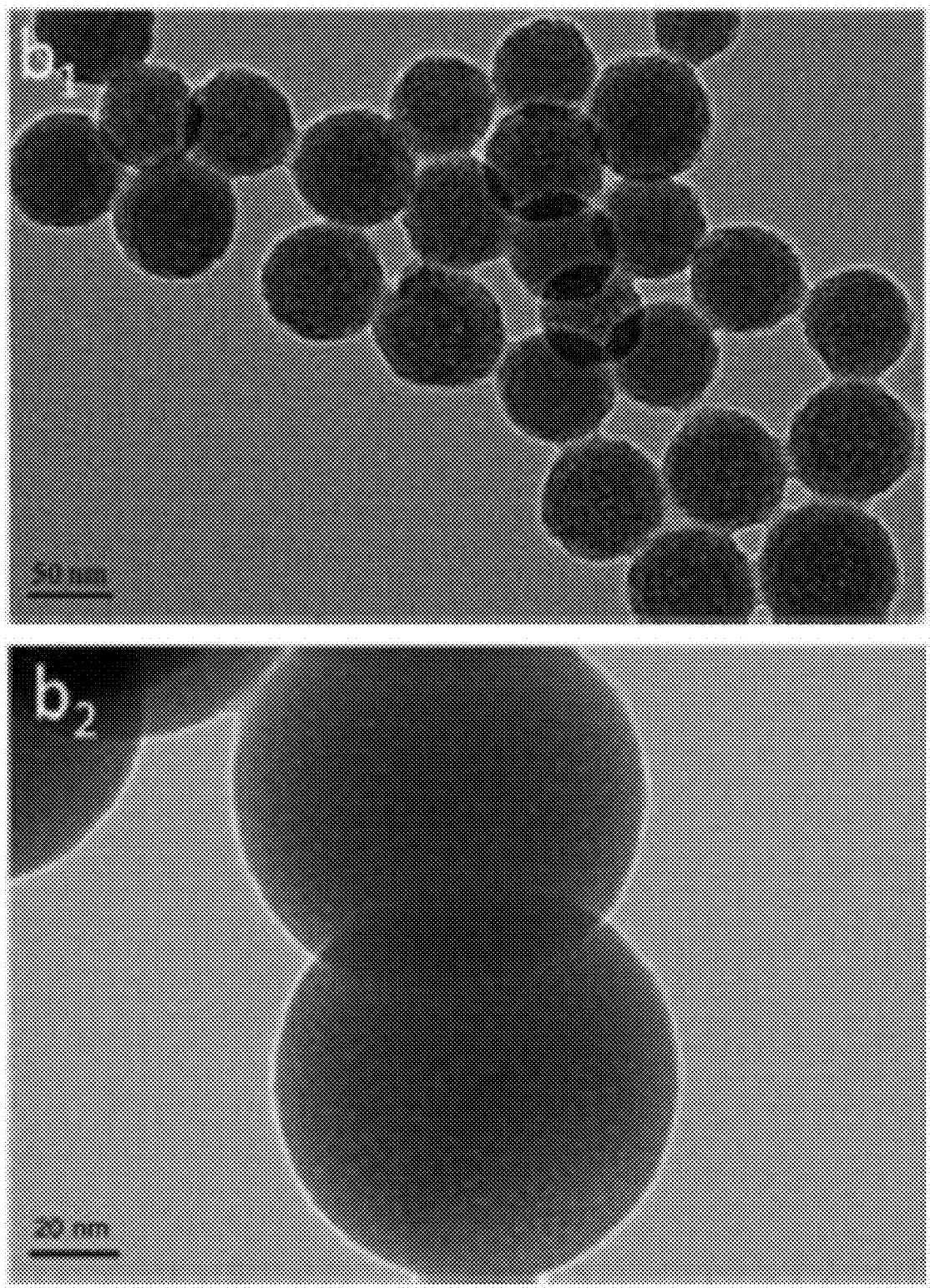
FIG. 2 is a TEM photograph of mesoporous silica in accordance with the invention.

The present invention provides a water-proofing anti-sticking ink for sterilization monitoring indicator tapes, comprising a mesoporous nanomaterial, an oil-based binder, an oil-based diluent and a defoamer. The mesoporous nanomaterial is preferably mesoporous silica in the present invention, having the structure shown in FIG. 1-2, and thus, the following examples are provided based on different components by mass percentages:

Example 1: mesoporous $SiO_2$ (having a solid content of 15% by mass), oil-based binder polyurethane (30% by mass), slow-dry-type oil-based diluent 783 (54% by mass) and a defoamer (1% by mass) were mixed under stirring, to produce water-proofing anti-sticking ink for sterilization monitoring indicator tapes, and then the water-proofing anti-sticking ink is printed by flexography on a pressure steam sterilization indicator tape which is not subjected to water-proofing treatment.

Example 2: mesoporous $SiO_2$ (having a solid content of 10% by mass), oil-based binder polyurethane (30% by mass), slow-dry-type oil-based diluent 783 (59% by mass) and a defoamer (1% by mass) were mixed under stirring, to produce water-proofing anti-sticking ink for sterilization monitoring indicator tapes, and then the water-proofing anti-sticking ink is coated on a pressure steam sterilization indicator tape which is not subjected to water-proofing treatment.

Example 3: mesoporous $SiO_2$ (having a solid content of 12% by mass), oil-based binder polyurethane (30% by mass), slow-dry-type oil-based diluent 783 (57% by mass) and a defoamer (1% by masse) were mixed under stirring, to produce water-proofing anti-sticking ink for sterilization monitoring indicator tapes, and then the water-proofing anti-sticking ink is coated on a ethylene oxide sterilization indicator tape which is not subjected to water-proofing treatment.

It should be understood that the above-mentioned embodiments are merely illustrative of the technical concept and features of the present invention, and are intended to allow those skilled in the art to understand the contexts of the invention and to apply it, without limiting the scope of the invention. Any equivalent alterations or modifications in accordance with the spirit of the essential technical solutions of the present invention are intended to fall within the scope of the invention.

The invention claimed is:

1. A water-proofing anti-sticking ink for sterilization monitoring indicator tapes, wherein the water-proofing anti-sticking ink comprises a mesoporous nanomaterial, an oil-based binder, an oil-based diluent and a defoamer, and the solid content of the mesoporous nanomaterial accounts for 10-20% by mass, the oil-based binder accounts for 20-40% by mass, the oil-based diluent accounts for 50-60% by mass, and the defoamer accounts for 1-5% by mass.

2. The water-proofing anti-sticking ink according to claim 1, characterized in that the mesoporous nanomaterial is silica, titanium dioxide, alumina, tin oxide, or a mixture of any two or more thereof.

3. The water-proofing anti-sticking ink according to claim 1, characterized in that the oil-based binder withstands high temperature vapor of 140° C. and has a certain adhesion to a textured paper substrate, with the adhesion level being IS0-4B.

4. The water-proofing anti-sticking ink according to claim 3, characterized in that the oil-based binder is a solvent-based polyurethane, epoxy resin, or acrylic resin, accounting for 30% by mass.

5. The water-proofing anti-sticking ink according to claim 4, characterized in that the oil-based diluent is slow-dry-type 783 diluent.

6. The water-proofing anti-sticking ink according to claim 5, characterized in that the main active ingredient of the defoamer is polydimethylsiloxane, accounting for 0.5%-1% by mass.

7. The water-proofing anti-sticking ink according to claim 1, characterized in that the sterilization monitoring indicator tape is a pressure steam sterilization indicating tape, or an ethylene oxide sterilization indicator tape, or a plasma sterilization indicator tape; and during the production of a sterilization monitoring indicator tape, color-changing ink is printed on a medical-grade textured paper tape, and then a layer of the water-proofing anti-sticking ink is coated thereon.

8. A water-proofing anti-sticking ink for sterilization monitoring indicator tapes, wherein the water-proofing anti-sticking ink comprises a mesoporous nanomaterial, an oil-based binder, an oil-based diluent and a defoamer, the mesoporous nanomaterial is silica, titanium dioxide, alumina, tin oxide, or a mixture of any two or more thereof, and the solid content of the mesoporous nanomaterial accounts for 10-20% by mass, and the oil-based binder withstands high temperature vapor of 140° C. and has a certain adhesion to a textured paper substrate, with the adhesion level being IS0-4B, and the oil-based binder is a solvent-based polyurethane, epoxy resin, or acrylic resin, accounting for 30% by mass.

9. The water-proofing anti-sticking ink according to claim 8, characterized in that the oil-based diluent is slow-dry-type 783 diluent.

10. The water-proofing anti-sticking ink according to claim 9, characterized in that the main active ingredient of the defoamer is polydimethylsiloxane, accounting for 0.5%-1% by mass.

11. The water-proofing anti-sticking ink according to claim 8, characterized in that the sterilization monitoring indicator tape is a pressure steam sterilization indicating tape, or an ethylene oxide sterilization indicator tape, or a plasma sterilization indicator tape; and during the production of a sterilization monitoring indicator tape, color-changing ink is printed on a medical-grade textured paper tape, and then a layer of the water-proofing anti-sticking ink is coated thereon.

12. The water-proofing anti-sticking ink according to claim 8, characterized in that the oil-based diluent accounts for 50-60% by mass, and the defoamer accounts for 1-5% by mass.

* * * * *